2,881,149

HARDENABLE MIXTURES OF AN EPOXY RESIN AND A RESIN FROM FORMALDEHYDE AND AN ARYLAMINE AND HARDENED PRODUCTS THEREFROM

Jan Hendrik van der Neut, The Hague, Netherlands, and Alfred Renner, Basel, Switzerland, assignors to Ciba Limited, Basel, Switzerland, a Swiss firm No Drawing. Application March 27, 1957
Serial No. 648,799

Claims priority, application Switzerland April 4, 1956

6 Claims. (Cl. 260—45.2)

This invention relates to hardenable epoxy resin compositions and to hardened products produced therefrom.

For the hardening of epoxy resins (ethoxyline resins) various compounds containing primary amino groups have already been recommended, which react with epoxy resins even at room temperature and for this reason are not capable of useful production of compositions, stable on storage, for the production of hardened products, or also such compounds as only react at relatively high temperatures and so slowly that compositions containing them are unsatisfactory for certain purposes, for example for use in the manufacture of molded products.

The present invention provides a method for producing a hard mass, wherein a mixture of an epoxy resin and a resin from formaldehyde and an arylamine of the formula:

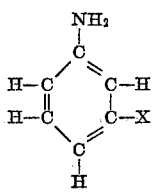

in which X is hydrogen or methyl, said latter resin having more than 50% of its nitrogen content in the form of primary amino groups, is subjected to heat.

The invention also provides compositions for use in the manufacture of hard masses, especially molded products, said compositions being stable on storage at room temperature and capable of rapid hardening in the hot and being mixtures of an epoxy resin and a resin from formaldehyde and an arylamine as above specified.

As hardening agents in such compositions aniline-formaldehyde resins are especially concerned as are obtainable, for example, when 1 mol of aniline is heated to temperatures below 60° C., preferably to 20°–30° C., with less than 1 mol, preferably 0.5–0.75 mol of formaldehyde in an acid aqueous medium in the absence of organic solvents and when the product, freed from unreacted aniline, washed and dried, if it does not already possess the desired content of primary amino groups, is heated alone or in the presence of an inert organic solvent, such as nitrobenzene, to approximately melting temperature until a lower melting product of the desired composition is obtained. In this product, to be referred to hereinafter as β-aniline-formaldehyde resin, the nitrogen content is present to the extent of about 82% in the form of primary amino groups.

There are also suitable as hardening agents m-toluidine-formaldehyde resins obtainable by condensation of 1 mol of m-toluidine with less than 1 mol, preferably 0.5–0.75 mol of formaldehyde, in an acid aqueous medium. In these resins the nitrogen content is present to the extent of up to 100% in the form of primary amino groups.

As epoxy resins (ethoxyline resins) for use in the compositions of this invention containing the specified hardening agents for the production of hardenable masses, especially molded products, products are concerned as are obtainable in known manner, for example by reaction of polyhydric hydroxyl compounds, especially polyhydric phenols, such as p:p'-dihydroxy diphenyl-dimethyl methane or phenol-formaldehyde condensates, with epichlorhydrin in an alkaline medium.

Compositions comprising epoxy resin and hardening agent as above specified can contain additions of known type, such as filling materials, lubricants, flowing agents, coloring agents, compatible resins, plasticizers and other modifying agents.

The following examples illustrate the invention, the parts and percentages being by weight.

Example 1

150 parts of a polyglycidyl ether of a phenol-formaldehyde condensate, prepared as described below, 100 parts of β-aniline-formaldehyde resin, 750 parts of talc, 10 parts of glycerol monostearate and 10 parts of nigrosine are ground in a ball mill for 24 hours. A molding powder is produced which flows easily, can be worked well and hardens rapidly on molding but which after storage for 6 months at room temperature still shows no reduction of its capacity for flowing.

The molding powder thus produced was molded at 165° C. under a pressure of 500 kg./cm.$^2$ and gave after a dwell of 3 minutes molded objects which could be easily detached from the hot mold and had an excellent lustre and appearance and also very good physical properties. Rods of the dimensions 4 x 10 x 60 mm.$^3$ gave the following figures:

| | |
|---|---:|
| Bending strength _____kg./cm.$^2$__ | 430 |
| Impact bending strength _____cm. kg./cm.$^2$__ | 1.4 |
| E-modulus _____kg./cm.$^2$__ | 169,000 |
| Martens heat test (VSM-Method). This figure could be increased to 164° C. by 2 hours' after-treatment at 150° C. _____° C.__ | 114 |
| Water absorption after 24 hours at 20° C. percent__ | 0.05 |
| Water absorption after 10 minutes at 100° C. percent__ | 0.11 |
| Surface resistance (by German standard test VDE 0302) _____MΩ__ | >10,000 |

The above-mentioned polyglycidyl ether was prepared as follows:

752 parts of phenol, 744 parts of aqueous formaldehyde solution (30.0% CH$_2$O) and 32 parts of N-hydrochloric acid were heated to boiling with stirring and reflux cooling and after subsiding of the exothermic reaction condensed for 2 hours at boiling temperature. 30 parts of N-caustic soda solution were then added, the aqueous layer was separated and the reaction product washed twice with hot water and distilled with steam until phenol could no longer be detected in the distillate. The resulting product was now dissolved in 2240 parts of epichlorhydrin. The solution produced was subjected to the addition at 50° C. of 128 parts of 50% aqueous caustic soda solution and 240 parts of powdered solid caustic soda in small portions. The excess of epichlorhydrin was distilled off under 15 mm. pressure, the distillation residue taken up in 1445 parts of trichlorethylene and the solution filtered and washed several times with water. The resin solution was now again heated under 15 mm. pressure whereby the volatile constituents distilled off until the temperature of the resin solution amounted to 150° C. 1014 parts remained of a light brown resin with a softening point (Krämer-Sarnow) of 76° C. and an epoxy content of 4.2 mol./kg.

Example 2

131 parts of a polyglycidyl ether of a phenol-formaldehyde condensate with an epoxy content of 3.65 mol./kg. and a softening point of 79° C., obtained in an analogous manner to that described in Example 1, 49 parts of β-aniline-formaldehyde resin, 120 parts of dried wood flour, 3 parts of stearic acid amide and 3 parts of nigrosine are ground for 16 hours in a ball mill. By this means an easily flowing, easily worked and rapidly hardening molding powder is obtained which is stable at room temperature for longer than 6 months without loss of flowing capacity.

By molding the resulting powder for 4 minutes at 165° C. under a pressure of 500 kg./cm.$^2$, molded objects were obtained which were easily detachable from the hot mold, had a good appearance and exhibited the following physical properties:

| | |
|---|---|
| Bending strength _____ kg./cm.$^2$__ | 880 |
| Impact bending strength _____ cm. kg./cm.$^2$__ | 4.9 |
| E-modulus _____ | 70,700 |
| Heat test _____ ° C__ | 67 |

When in the above example instead of 131 parts of the glycidyl ether and 49 parts of the β-aniline-formaldehyde resin a. 115 parts of the glycidyl ether and 65 parts of the β-aniline-formaldehyde resin or
b. 103 parts of the glycidyl ether and 77 parts of the β-aniline-formaldehyde resin or
c. 85 parts of the glycidyl ether and 95 parts of the β-aniline-formaldehyde resin are used, molding powders and molded objects of similar properties are obtained. The latter gave the following physical values:

| Example | Bending strength, kg./cm.$^2$ | Impact bending strength, cm. kg./cm.$^2$ | E-Modulus, kg./cm.$^2$ | Martens heat test, ° C. |
|---|---|---|---|---|
| a | 900 | 5.1 | 67,200 | 83 |
| b | 820 | 5.0 | 68,000 | 73 |
| c | 810 | 4.4 | 66,000 | 68 |

What we claim is:

1. An 1,2-epoxy resin composition hardenable by heat and pressure comprising as a hardener for the 1,2-epoxy resin a resin from formaldehyde and an arylamine of the formula

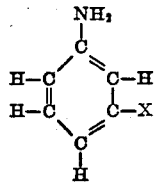

wherein X is a substituent of the group consisting of hydrogen and methyl, said latter resin having more than 50% of its nitrogen content in the form of primary amino groups.

2. An 1,2-epoxy resin composition hardenable by heat and pressure comprising as a hardener for the 1,2-epoxy resin a resin from formaldehyde and aniline, said latter resin having about 80% of its nitrogen content in the form of primary amino groups.

3. An 1,2-epoxy resin composition hardenable by heat and pressure comprising as a hardener for the 1,2-epoxy resin a resin from formaldehyde and m-toluidine, said latter resin having about 100% of its nitrogen content in the form of primary amino groups.

4. The molded and heat hardened reaction product of a composition of matter comprising a 1,2-epoxy resin and a resin from formaldehyde and an arylamine of the formula

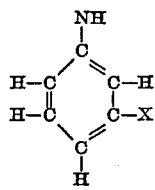

wherein X is a substituent of the group consisting of hydrogen and methyl, said latter resin having more than 50% of its nitrogen content in the form of primary amino groups.

5. The molded and heat hardened reaction product of a composition of matter comprising a 1,2-epoxy resin and a resin from formaldehyde and aniline, said latter resin having about 80% of its nitrogen content in the form of primary amino groups.

6. The molded and heat hardened reaction product of a composition of matter comprising a 1,2-epoxy resin and a resin from formaldehyde and m-toluidine, said latter resin having about 100% of its nitrogen content in the form of primary amino groups.

References Cited in the file of this patent

UNITED STATES PATENTS

| 2,414,748 | Kistler | Jan. 21, 1947 |
| 2,687,397 | Dannenberg | Aug. 24, 1954 |

OTHER REFERENCES

Bishop: "The Use of Aniline-Formaldehyde Resins as Curing Agents for Epoxide Resins," Chemistry and Industry, July 28, 1956, page 759.